US008950362B2

(12) United States Patent
Heo et al.

(10) Patent No.: US 8,950,362 B2
(45) Date of Patent: Feb. 10, 2015

(54) COMPLEX FLOATING WETLAND EQUIPMENT (75) Inventors: Woo Myung Heo, Donghae-si (KR); Gil Son Hwang, Ansan-si (KR); Dong Oug Kim, Seongnam-si (KR); Ho Joon Kim, Daejeon-si (KR); Dong Seop Kim, Gunpo-si (KR); Sun Hee Lee, Ansan-si (KR); Haeng Seop Song, Ansan-si (KR)

(73) Assignees: Kangwon National University University-Industry Cooperation Foundation (KR); Korea Water Resources Corporation (KR); Halla Engineering & Construction Corp. (KR)

( * ) Notice: Subject to any disclaimer, the term of this patent is extended or adjusted under 35 U.S.C. 154(b) by 0 days.

(21) Appl. No.: 13/997,803

(22) PCT Filed: Apr. 6, 2012

(86) PCT No.: PCT/KR2012/002619
§ 371 (c)(1),
(2), (4) Date: Jun. 25, 2013

(87) PCT Pub. No.: WO2013/081255
PCT Pub. Date: Jun. 6, 2013

(65) Prior Publication Data
US 2014/0251225 A1 Sep. 11, 2014

(30) Foreign Application Priority Data

Nov. 30, 2011 (KR) .......................... 10-2011-0126801
Nov. 30, 2011 (KR) .......................... 10-2011-0126810

(51) Int. Cl.
*A01K 29/00* (2006.01)
*A01K 61/00* (2006.01)

(52) U.S. Cl.
USPC ........................................................ 119/217

(58) Field of Classification Search
USPC ........... 119/217, 221, 209; 114/264; 47/59 R; 210/602
See application file for complete search history.

(56) References Cited

U.S. PATENT DOCUMENTS 6,089,191 A * 7/2000 Calinski et al. ................ 119/221
6,539,894 B1 * 4/2003 Byrne et al. ................... 119/234
(Continued)

FOREIGN PATENT DOCUMENTS

JP          10211897        8/1998
JP          2000188991      7/2000
(Continued)

OTHER PUBLICATIONS

International Search Report—PCT/KR2012/002619 dated Nov. 23, 2012.

*Primary Examiner* — Yvonne Abbott
(74) *Attorney, Agent, or Firm* — Cantor Colburn LLP (57) ABSTRACT An otter habitation section, an overland section, an inclined-surface section, a first spawning section, a second spawning section and a roost are all provided. Accordingly, otters and birds can sufficiently obtain preys, and fishes secure a spawning ground suitable for spawning characteristics. Therefore, the otters, the fishes and the birds can inhabit together. Further, since frames are made of wood for providing buoyant force or the frames are made of stainless steel for reinforcing strength and wood for providing buoyant force, a small amount of polyethylene foam is required. Accordingly, it is possible to obtain floating wetland equipment with a simple structure. Furthermore, the wooden frames itself provide a spawning ground of fishes.

12 Claims, 5 Drawing Sheets

(56) References Cited

U.S. PATENT DOCUMENTS

| | | | |
|---|---|---|---|
| 7,789,043 B2 * | 9/2010 | Kania et al. | 119/209 |
| 7,810,279 B2 * | 10/2010 | Kania et al. | 47/59 R |
| 8,250,808 B2 * | 8/2012 | Kania et al. | 47/59 S |
| 2009/0165374 A1 * | 7/2009 | Kania et al. | 47/65.5 |
| 2009/0255177 A1 * | 10/2009 | Kania et al. | 47/65 |
| 2011/0146559 A1 * | 6/2011 | Kania et al. | 114/264 |
| 2012/0006743 A1 * | 1/2012 | Streb | 210/602 |
| 2013/0125825 A1 * | 5/2013 | Kania et al. | 119/221 |

FOREIGN PATENT DOCUMENTS

| | | |
|---|---|---|
| KR | 100939204 | 1/2010 |
| KR | 101032837 | 5/2011 |

\* cited by examiner

COMPLEX FLOATING WETLAND EQUIPMENT

TECHNICAL FIELD

The present invention relates to floating wetland equipment.

BACKGROUND ART

In recent, in order to secure power and water, a lot of dams have been built. For this reason, the ecosystem around the dam has been destroyed.

For example, an increase in water level caused by building the dam leads to the disappearance of the habitat of otters that inhabit at the waterside. Further, the habitat of floating-leaved plants or submerged plants that grow in shallow water has been disappeared. Furthermore, in addition to the habitat of fishes which spawn at the surface of the shallow water or the bottom of the shallow water, the habitat of aquatic insects has been also disappeared. For this reason, the habitat of birds which eat the aquatic insects and the fishes has been lost. In order to solve the problems, various floating wetland facilities have been developed.

Disadvantageously, since conventional floating wetland equipment provides the habitat for any one of the otters and the fishes, there is a problem that the conventional equipment is not suitable to allow the otters, the fishes, and the birds to inhabit together. Further, in the conventional floating wetland equipment that provides only the habitat of the fishes, since the otter which is a natural enemy of a predator such as bass or bluegill does not inhabit around the equipment, it is difficult to prevent native fishes or eggs of native fishes from being eaten by the predator. Accordingly, there is a problem that the conventional equipment does not serve as the habitat of fishes.

Moreover, in the conventional floating wetland equipment, since a frame is made of stainless steel, a large amount of polyethylene foam is required to float the frame on the water, so that a structure thereof becomes complicated.

In addition, since a second spawning ground of the conventional floating wetland equipment is filled with gravels, the conventional floating wetland equipment is not suitable for a spawning ground of fishes that prefer sands or soils.

DETAILED DESCRIPTION OF THE INVENTION

Technical Problem

An aspect of the present invention provides complex floating wetland equipment with which it is possible to allow otters, fishes and birds to inhabit together, and to prevent approaching of a predator such as bass or bluegill.

An aspect of the present invention also provides complex floating wetland equipment with which it is possible to cope with various spawning characteristics of fishes with a simple structure.

Technical Solution

According to an aspect of the present invention, there is provided a fish aquaculture facility including a floating bridge; and floating bodies that are provided at upper left and right sides of the floating bridge and lower left and right sides of the floating bridge around the floating bridge. At least any one floating body of the floating bodies may include an overland section, an inclined-surface section, a first spawning section, and a second spawning section, and at least any one floating body of the floating bodies includes an otter habitation section and an inclined-surface section.

According to another aspect of the present invention, there is provided complex floating wetland equipment including a cross-shaped floating bridge; a first floating body that is connected onto an upper left side of the floating bridge by using a bolt and a nut and has an overland section, an inclined-surface section, a first spawning section and a second spawning section; a second floating body that is connected onto an upper right side of the floating bridge by using a bolt and a nut and has an overland section, an inclined-surface section, a first spawning section and a second spawning section; a third floating body that is connected onto a lower left side of the floating bridge by using a bolt and a nut and has an otter habitation section and an inclined-surface section; a fourth floating body that is connected onto a lower right side of the floating bridge by using a bolt and a nut and has an overland section, an inclined-surface section, a first spawning section and a second spawning section; and at least one roost that is provided at the floating bridge. The inclined-surface sections may be partially flooded in the water, and a spawning space of the second spawning section may be filled with any one of gravels, sands and soils, or a mixture of gravels, sands and soils depending on spawning characteristics of fishes.

According to still another aspect of the present invention, there is provided complex floating wetland equipment including floating bodies that are connected to one another; and an otter habitation structure that is provided in at least any one of the floating bodies. Frames may be provided at the respective floating bodies, and the frames may be made of wood to provide buoyant force and a spawning ground.

According to still another aspect of the present invention, there is provided complex floating wetland equipment including a first floating body in which one end is flooded in the water; a second floating body in which one end is connected to the other end of the first floating body by a hinge; a third floating body in which one end is connected to the other end of the second floating body by a round bar; a fourth floating body in which one end is connected to the other end of the third floating body by a hinge; a fifth floating body in which one end is connected to the other end of the fourth floating body by a hinge and the other end is flooded in the water; and an otter habitation structure that is provided to at least any one of the second floating body and the fourth floating body. A frame of the first floating body, a frame of the second floating body, a frame of the third floating body, a frame of the fourth floating body, and a frame of the fifth floating body may be made of wood, and the wooden frames themselves may provide buoyant force and a spawning ground of fishes.

Advantageous Effect

As set forth above, according to exemplary embodiments of the invention, an otter habitation section, an overland section, an inclined-surface section, a first spawning section, a second spawning section and a roost are all provided. Accordingly, otters and birds can sufficiently obtain preys, and fishes secure a spawning ground suitable for spawning characteristics. Therefore, the otters, the fishes and the birds can inhabit together.

According to exemplary embodiments of the invention, since floating bodies are provided at upper left and right sides of a floating bridge and lower left and right sides of the floating bridge around the floating bridge, due to waves is difficult to occur, so that it is possible to provide stable habitats to otters, fishes and birds.

According to exemplary embodiments of the invention, since a manager walks on a floating bridge to easily approach all floating bodies, it is possible to easily manage the habitats around the floating bodies.

According to exemplary embodiments of the invention, since otters prevent approaching of bass or bluegill, it is possible to a stable spawning ground to native fishes.

According to exemplary embodiments of the invention, since frames are made of wood for providing buoyant force or the frames are made of stainless steel for reinforcing strength and wood for providing buoyant force, a small amount of polyethylene foam is required. Accordingly, it is possible to obtain floating wetland equipment with a simple structure. Further, the wooden frames itself provide a spawning ground of fishes.

According to exemplary embodiments of the invention, driftwoods which have been carried onto a dam and a reservoir due to flooding are connected to wooden frames to easily enlarge a size of floating wetland equipment. Thus, it is possible to reuse the driftwoods discarded as wastes. Further, since the frames and the driftwoods are all wood, it is possible to allow the fishes to spawn at the driftwoods in addition to the wooden frames without sensing of difference.

According to exemplary embodiments of the invention, since second spawning sections are respectively filled with gravels, sands and soils, it is possible to cope with various spawning characteristics of fishes. In addition, a wooden underwater framework and a wooden underwater frame that constitute the second spawning section themselves can provide buoyant force and a spawning ground of fishes.

EMBODIMENTS FOR CARRYING OUT THE INVENTION

Exemplary embodiments of the present invention will now be described in detail with reference to the accompanying drawings.

While the present invention has been shown and described in connection with the exemplary embodiments, it will be apparent to those skilled in the art that modifications and variations can be made without departing from the spirit and scope of the invention as defined by the appended claims.

Figure 1:
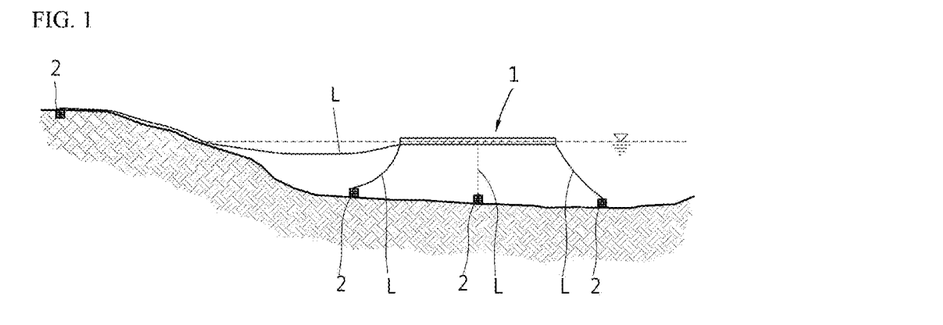
FIG. 1 is a diagram illustrating a state where complex floating wetland equipment according to a first exemplary embodiment of the present invention is provided in a reservoir.

Hereinafter, complex floating wetland equipment according to a first exemplary embodiment of the present invention will be described in detail. FIG. 1 is a diagram illustrating a state where complex floating wetland equipment according to a first exemplary embodiment of the present invention is provided in a reservoir.

As shown in FIG. 1, complex floating wetland equipment 1 according to a first exemplary embodiment of the present invention is floated on the surface of the water, and is fixed to fixtures 2 provided at a bottom of the reservoir and fixtures 2 provided at land by a rope L. When the rope L fixed to the land is pulled out, the complex floating wetland equipment 1 is moved toward the land.

Figure 2:
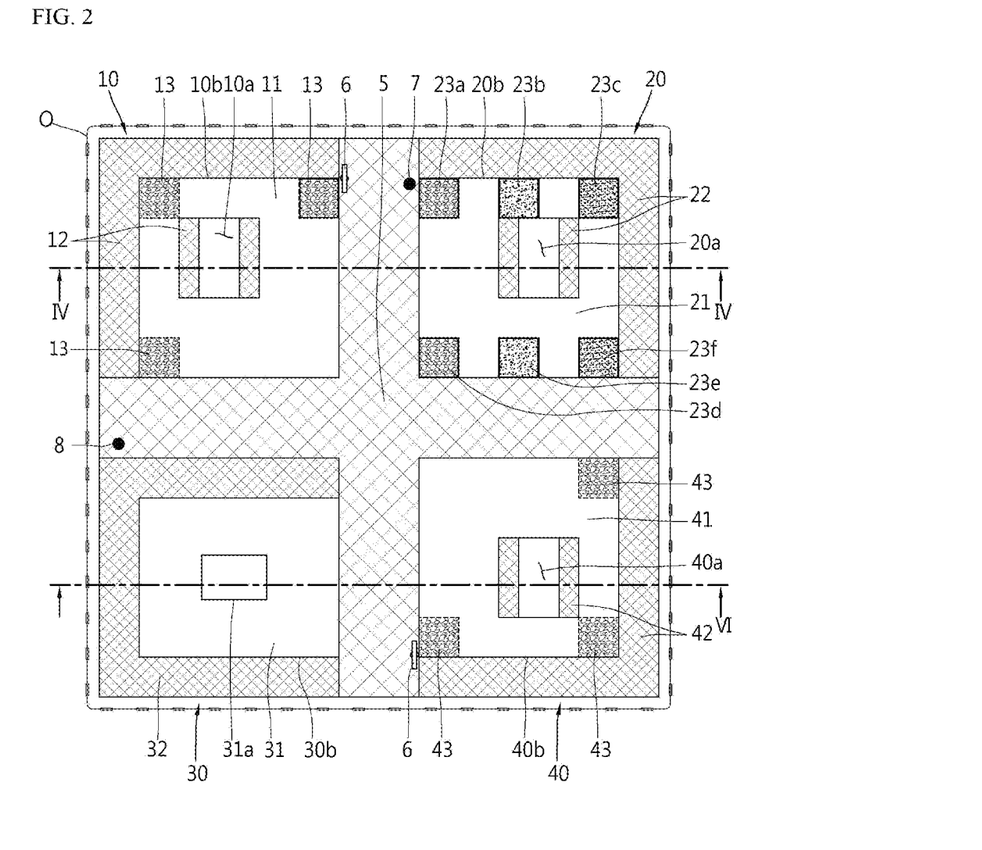
FIG. 2 is a plane view of the complex floating wetland equipment shown in FIG. 1.

FIG. 2 is a plane view of the complex floating wetland equipment shown in FIG. 1.

As shown in FIG. 2, the complex floating wetland equipment 1 is fenced with an oil fence O.

The complex floating wetland equipment 1 includes a floating bridge 5, a first floating body 10, a second floating body 20, a third floating body 30 and a fourth floating body 40.

The floating bridge 5 is formed in a cross shape, and has a size of 2 meters width, 14 meters wide and 14 meters long.

Around the floating bridge 5, the floating bodies 10, 20, 30 and 40 are provided at upper left and right sides and lower left and right sides of the floating bridge 5, respectively. In such a configuration, a manager walks on the floating bridge 5 to easily approach all of the floating bodies 10, 20, 30 and 40. Further, since the floating bodies 10, 20, 30 and 40 are provided at the upper left and right sides and the lower left and right sides of the floating bridge 5 around the floating bridge 5, shaking due to waves is difficult to occur, so that the complex floating wetland equipment can serve as a stable habitat.

Roosts 6 are provided at the floating bridge 5. Birds rest at the roosts 6. The number of the roosts 6 and the arrangement thereof are particularly limited, but may be provided in various manners.

Figure 3:
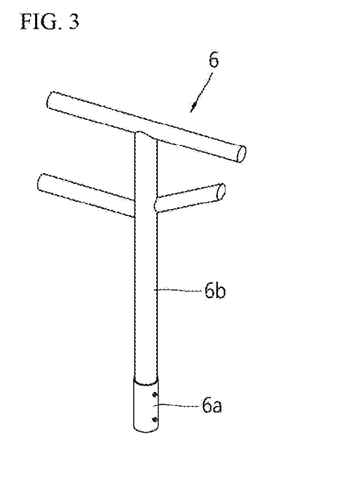
FIG. 3 is a perspective view of a roost shown in FIG. 2.

FIG. 3 is a perspective view of the roost shown in FIG. 2.

As shown in FIG. 3, the roost 6 includes a pipe 6a and a hardwood 6b. The pipe 6a is weld to the floating bridge 5. The hardwood 6b is inserted into the pipe 6a. As illustrated in FIG. 2, an underwater monitoring camera 7 or a land monitoring camera 8 is provided at the floating bridge 5. The number of the underwater monitoring camera 7 or the land monitoring camera 8 and the arrangement thereof are particularly limited, but may be provided in various manners.

Each of the first floating body 10, the second floating body 20, the third floating body 30 and the fourth floating body 40 has a size of 6 meters wide and 6 meters long.

The first floating body 10 is connected onto the upper left side of the floating bridge 5 by a bolt (not shown) and a nut (not shown). Alternatively, the first floating body may be connected onto the upper left side of the floating bridge 5 through welding. An opening 10a is formed in a central portion of the first floating body 10.

The second floating body 20 is connected onto the upper right side of the floating bridge 5 by a bolt and a nut. Alternatively, the second floating body may be connected onto the upper right side of the floating bridge 5 through welding. An opening 20a is formed in a central portion of the second floating body 20.

The third floating body 30 is connected onto the lower left side of the floating bridge 5 by a bolt and a nut. Alternatively, the third floating body may be connected onto the lower left side of the floating bridge 5 through welding.

The fourth floating body 40 is connected onto the lower right side of the floating bridge 5 by a bolt and a nut. Alternatively, the fourth floating body may be connected onto the lower right side of the floating bridge 5 through welding. An opening 40a is formed in a central portion of the fourth floating body 40.

Figure 4:
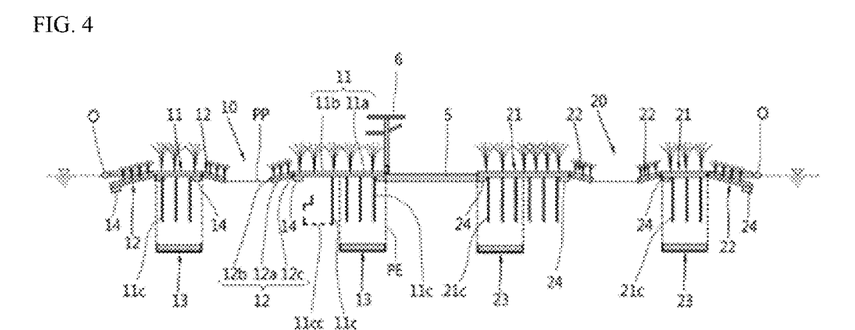
FIG. 4 is a cross-sectional view taken along line IV-IV shown in FIG. 2.

FIG. 4 is a cross-sectional view taken along line IV-IV shown in FIG. 2.

As shown in FIG. 4, the first floating body 10 includes an overland section 11, first spawning sections 11c, inclined-surface sections 12, second spawning sections 13, and floating members 14.

The overland section 11 includes a frame 11a and a planting mat 11b on which plants are planted.

The frame 11a is made of wood for providing buoyant force and stainless steel for reinforcing strength. In order to additionally provide buoyant force to the frame 11a, a small amount of polyethylene foam is provided at a lower surface of the frame 11a.

The planting mat 11b is provided at a top surface of the frame 11a. The planting mat 11b is made of a cashmilon fiber, a natural fiber or a synthetic fiber. Water parsley, yellow iris, phragmites japonica, rice plants, and reeds are planted on the planting mat 11b.

The first spawning section 11c includes a string hung on the lower surface of the frame 11b and cilia formed near the string. The string is made of polypropylene rope yarn. The cilium is made of bulked continuous filament. A washer is provided at an end of the first spawning section 11c in order to prevent the first spawning section 11c from floating or shaking. Further, the first spawning section 11c may include a box-shaped fish staying block that is provided at the lower surface of the frame 11b and has an entrance 11cc through which fishes pass.

As shown in FIGS. 2 and 4, the inclined-surface sections 12 are provided inside the opening 10a of the first floating body 10 such that a pair of inclined-surface sections faces to each other. Further, the inclined-surface sections 12 are provided along a circumference 10b of the first floating body 10.

The facing inclined-surface sections 12 are connected to each other by a polypropylene rope PP.

The inclined-surface section 12 includes a frame 12a, a planting mat 12b on which plants are planted, and a hinge 12c.

The frame 12a is made of wood for providing buoyant force and stainless steel for reinforcing strength. In order to additionally provide buoyant force to the frame 12a, a small amount of polyethylene foam may be provided at a lower surface of the frame 12a.

The planting mat 12b is provided at a top surface of the frame 12a.

Submerged plants or floating-leaved plants are planted on the planting mat 12b.

Examples of the submerged plants include watermilfoil, waterweeds, hornworts, pondweeds, and wild celery.

Examples of the floating-leaved plants include water lilies, large-leaf pondweeds, and water chestnuts.

One end of the frame 12a is connected to the opening 10a through the hinge 12c, and the other end of the frame 12a is flooded in the water. When the frame 12a rotates around the hinge 12c by about 15 degrees, the other end of the frame 12a is located under about 70 cm of the water.

The second spawning sections 13 are located in the water while hanging on a lower side of the overland section 11 by a rope PE and under about 1.5 m of the water.

Figure 5:
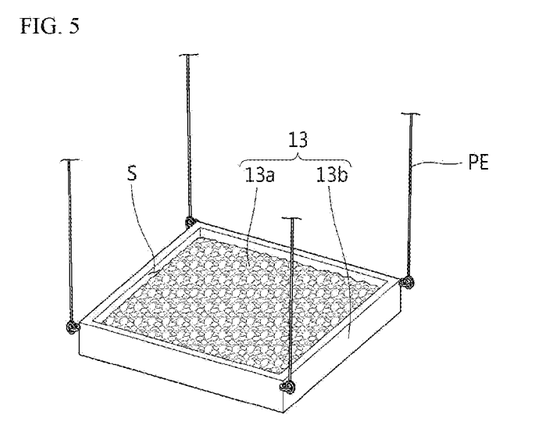
FIG. 5 is a perspective view of a second spawning section shown in FIG. 4.

FIG. 5 is a perspective view of the second spawning section shown in FIG. 4.

As shown in FIG. 5, the second spawning section 13 includes a frame 13a and a framework 13b.

The frame 13a is connected to the frame 11a of the overland section 11 by using four polyethylene ropes PE.

The frame 13a is made of wood for providing buoyant force and stainless steel for reinforcing strength. In order to additionally provide buoyant force to the frame 13a, a small amount of polyethylene foam may be provided at a lower surface of the frame 13a.

The framework 13b surrounds the frame 13a to form a spawning space S.

In order to cope with various spawning characteristics of fishes, the spawning space S is filled with any one of gravels, sands and soils or a mixture of gravels, sands and soils.

For example, *Nipponocypris* and Cyprinidae prefer to spawn at gravels.

*Rhinogobius* and *Tridentiger brevispinis* prefer to spawn at sands or soils.

*Palaemon paucidens* and *Neocardina denticulata* prefer to spawn at roots of plants.

For reference, it is assumed that the gravel has an average particle diameter of about 4.76 mm or more, coarsed sand has an average particle diameter of about 0.25 mm to about 4.76 mm, and the soil has an average particle diameter of about 0.005 mm to about 0.25 mm.

The spawning spaces S are filled with gravels, sands and soils by a thickness of about 5 cm.

As illustrated in FIG. 2, three second spawning sections 13 are provided under the first floating body 10. The spawning spaces (S, not shown) of the three second spawning sections 13 are filled with the gravels. For reference, since the second spawning sections 13 are located under the overland section 11, the second spawning sections 13 should not be illustrated in FIG. 2. However, for convenience for explanation, the second spawning sections 13 are illustrated.

As illustrated in FIG. 4, the floating members 14 are configured to float the first floating body 10 on the surface of the water. The floating member 14 is made of polyethylene.

The second floating body 20 includes an overland section 21, first spawning sections 21c, inclined-surface sections 22, second spawning sections 23, and floating members 24.

The overland section 21, the inclined-surface sections 22, the first spawning sections 21c, the second spawning sections 23 and the floating members 24 have the same configurations as those of the overland section 11, the inclined-surface sections 12, the first spawning sections 11c, the second spawning sections 13 and the floating members 14 of the first floating body 10, and descriptions thereof will not be repeated.

However, as illustrated in FIG. 2, six second spawning sections 23a, 23b, 23c, 23d, 23e and 23f are provided under the second floating body 20.

Spawning spaces (S, not shown) of the second spawning sections 23a and 23d are filled with gravels, spawning spaces (S, not shown) of the second spawning sections 23b and 23e are filled with sands, and spawning spaces (S, not shown) of the second spawning sections 23c and 23f are filled with soils. For reference, since the second spawning sections 23 are located under the overland section 21, the second spawning sections 23 should not be illustrated in FIG. 2. However, for convenience for explanation, the second spawning sections 23 are illustrated.

Figure 6:
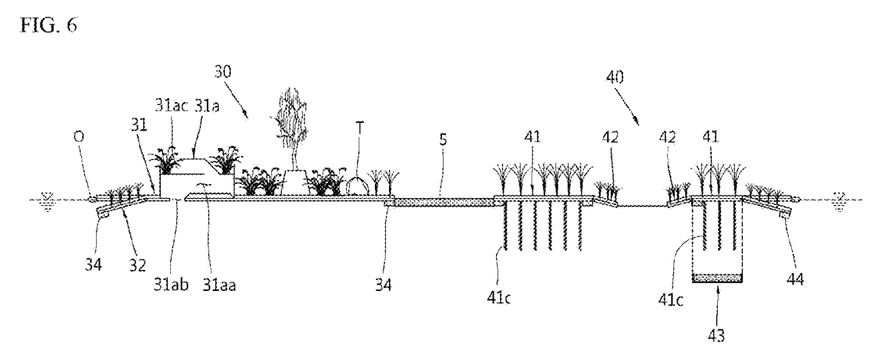
FIG. 6 is a cross-sectional view taken along line VI-VI shown in FIG. 2.

FIG. 6 is a cross-sectional view taken along line VI-VI shown in FIG. 2.

As illustrated in FIG. 6, the third floating body 30 includes an otter habitation section 31, inclined-surface sections 32, and floating members 34.

An otter habitation structure 31a is provided at the otter habitation section 31. Two or more otter habitation structures 31a may be provided at the otter habitation section 31.

The otter habitation structure 31a includes a habitation space 31aa where otters inhabit, an underwater entrance 3 lab allowing the otter to enter the habitation space 31aa in the water, and a land entrance 31ac allowing the otter to enter the habitation space 31aa on the land. Grasses are planted in front of the land entrance 31ac so as not to allow the natural enemy to see the land entrance 31ac.

Willow trees, reeds, yellow irises, and water parsley are planted at the otter habitation section 31 so as to allow the otter to dry his or her body or to take a rest.

An artificial stone T is provided at the otter habitation section 31 so as to allow the otter to take a rest, to excrete waste materials, and to eat food.

The inclined-surface sections 32 and the floating members 34 have the same configurations as those of the inclined-surface sections 12 and the floating members 14 of the first floating body 10, and descriptions thereof will not be repeated.

As illustrated in FIG. 6, the fourth floating body 40 includes an overland section 41, first spawning sections 41c, inclined-surface sections 42, second spawning sections 43, and floating members 44.

The overland section 41, the inclined-surface sections 42, the first spawning sections 41c, the second spawning sections 43, and the floating members 44 have the same configurations as those of the overland section 11, the inclined-surface sections 12, the first spawning sections 11c, the second spawning sections 13, and the floating members 14 of the first floating body 10, and descriptions thereof will not be repeated.

As illustrated in FIG. 2, three second spawning sections 43 are provided under the fourth floating body 40 so as to have the arrangement different from the three second spawning sections 13 provided under the first floating body 10. Spawning spaces (S, not shown) of the second spawning sections 43 are filled with gravels.

Hereinafter, complex floating wetland equipment according to a second exemplary embodiment of the present invention will be described in detail.

Figure 7:
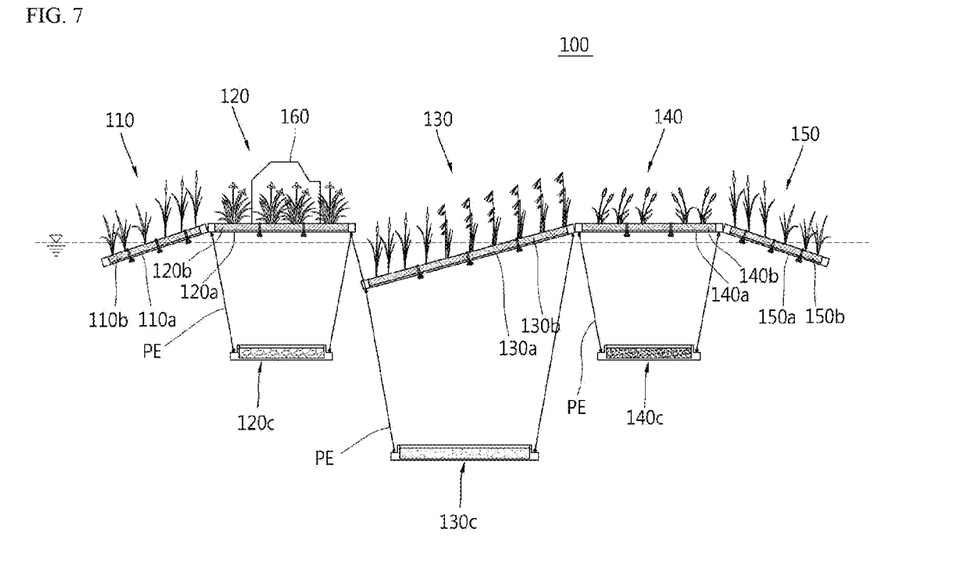
FIG. 7 is a side cross-sectional view of complex floating wetland equipment according to a second exemplary embodiment of the present invention.

FIG. 7 is a side cross-sectional view showing complex floating wetland equipment according to a second exemplary embodiment of the present invention.

As illustrated in FIG. 7, complex floating wetland equipment 100 according to a second exemplary embodiment of the present invention includes a first floating body 110, a second floating body 120, a third floating body 130, a fourth floating body 140, a fifth floating body 150, and an otter habitation structure 160.

The complex floating wetland equipment 100 has a size of about 5.1 meters wide and about 4.0 meters long.

Figure 8:
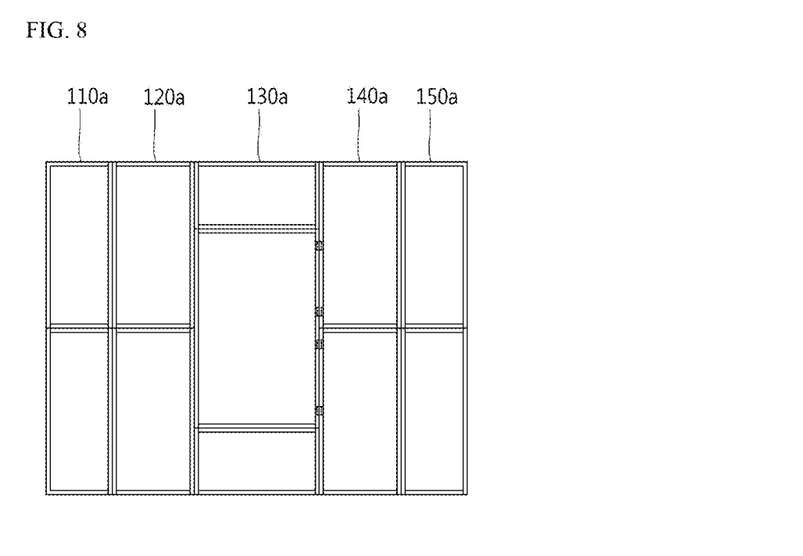
FIG. 8 is a diagram illustrating a state where a frame of a first floating body, a frame of a second floating body, a frame of a third floating body, a frame of a fourth floating body, and a frame of a fifth floating body shown in FIG. 7 are connected to one another.

FIG. 8 is a diagram illustrating a state where a frame of the first floating body, a frame of the second floating body, a frame of the third floating body, a frame of the fourth floating body and a frame of the fifth floating body shown in FIG. 7, are connected to one another.

A frame 110a of the first floating body 110, a frame 120a of the second floating body 120, a frame 130a of the third floating body 130, a frame 140a of the fourth floating body 140, and a frame 150a of the fifth floating body 150 shown in FIG. 8 are all made of wood for providing buoyant force. Accordingly, other fixation buoyant members are not required to float the first floating body 110, the second floating body 120, the third floating body 130, the fourth floating body 140, and the fifth floating body 150 on the water.

The first floating body 110 shown in FIG. 7 has a size of about 0.8 meters wide and about 4.0 meters long.

One end of the first floating body 110 is flooded in the water, and the other end thereof is connected to the second floating body 120 by a hinge. When the first floating body 110 rotates about the hinge by about 15 degrees, the one end of the first floating body 110 is located under about 70 cm of the water.

The first floating body 110 includes the frame 110a and a panting mat 110b on which plants are planted.

The planting mat 110b is provided at a top surface of the frame 110a. The planting mat 110b is made of a cashmilon fiber, a natural fiber, or a synthetic fiber. Submerged plants or floating-leaved plants are planted on the planting mat 110b.

Examples of the submerged plants include watermilfoil, waterweeds, hornworts, pondweeds, and wild celery. Examples of the floating-leaved plants include water lilies, large-leaf pondweeds, and water chestnuts.

The second floating body 120 shown in FIG. 7 has a size of about 1.0 meter wide and about 4.0 meters long.

One end of the second floating body 120 is connected to the first floating body 110 by a hinge, and the other end thereof is connected to the third floating body 130 by a round bar.

The second floating body 120 includes the frame 120a, a planting mat 120b on which plants are planted, and a second spawning section 120c.

The planting mat 120b is provided at a top surface of the frame 120a. The planting mat 120b is made of a cashmilon fiber, a natural fiber, or a synthetic fiber. Water parsley, yellow iris, phragmites japonica, rice plants, and reeds are planted on the planting mat 120b.

The second spawning section 120c is located in the water while hanging on a lower side of the frame 120a by a rope PE. The second spawning section 120c is located under about 1.5 m of the water.

Figure 9:
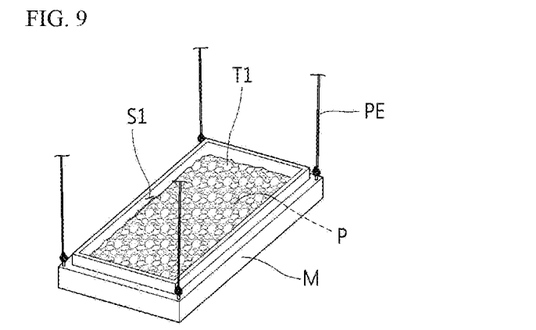
FIG. 9 is a diagram showing a second spawning section of the second floating body shown in FIG. 7.

FIG. 9 is a diagram illustrating the second spawning section of the second floating body shown in FIG. 7.

As illustrated in FIG. 9, the second spawning section 120c includes an underwater frame F and an underwater framework M.

Similarly to the frame 120a, the underwater frame F and the underwater framework M are made of wood. Thus, buoyant force of the underwater frame F and buoyant force of the underwater framework M are set to be equal to a weight of gravels T1, so that the second spawning section 120c can be floated on the water. Accordingly, it is possible to reduce burden of buoyant force of the frame 120a required to be floated without the fixation buoyant member. Further, the underwater frame F and the underwater framework M themselves provide a spawning ground for fishes.

The underwater frame F is hung on the frame 120a by four polyethylene ropes PE.

The underwater framework M surrounds the underwater frame F to form a spawning space S1. The spawning space S1 is filled with the gravels T1 by a thickness of about 5 cm.

The third floating body 130 shown in FIG. 7 has a size of about 1.5 meters wide and about 4.0 meters long.

One end of the third floating body 130 is connected to the first floating body 120 by the round bar, and the other end thereof is connected to the fourth floating body 140 by a hinge. The one end of the third floating body 130 is located under about 1.0 m of the water.

The third floating body 130 includes the frame 130a, a planting mat 130b on which plants are planted, and a second spawning section 130c.

The planting mat 130b is provided at a top surface of the frame 130a. The planting mat 130b is made of a cashmilon fiber, a natural fiber, or a synthetic fiber. Water parsley, yellow iris, phragmites japonica, rice plants, and reeds are planted on the planting mat 130b.

The second spawning section 130c is located in the water while hanging on a lower side of the frame 130a by a rope PE. The second spawning section 130c is located under about 3.0 m of the water.

Figure 10:
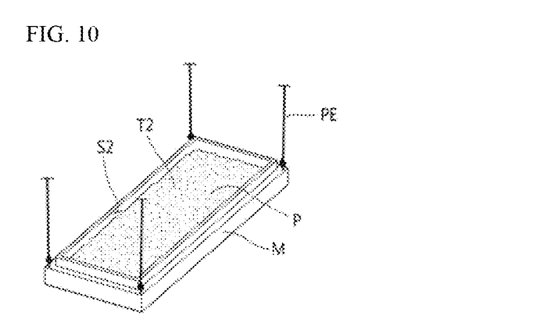
FIG. 10 is a diagram showing a second spawning section of the third floating body shown in FIG. 7.

FIG. 10 is a diagram illustrating the second spawning section of the third floating body shown in FIG. 7.

As illustrated in FIG. 10, the second spawning section 130c includes an underwater frame F and an underwater framework M. Similarly to the frame 130a, the underwater frame F and the underwater framework M are made of wood. The reason is described above.

The underwater frame F is hung on the frame 130a by four polyethylene ropes PE.

The underwater framework M surrounds the underwater frame F to form a spawning space S2 at the second spawning section 130c. The spawning space S2 is filled with the sands T2 by a thickness of about 5 cm.

The fourth floating body 140 shown in FIG. 7 has a size of about 1.5 meters wide and about 4.0 meters long.

One end of the fourth floating body 140 is connected to the third floating body 130 by the hinge, and the other end thereof is connected to the fifth floating body 150 by a hinge.

The fourth floating body 140 includes the frame 140a, a planting mat 140b on which plants are planted, and a second spawning section 140c.

The planting mat 140b is made of a cashmilon fiber, a natural fiber, or a synthetic fiber. Water parsley, yellow iris, phragmites japonica, rice plants, and reeds are planted on the planting mat 140b.

The second spawning section 140c is located in the water while hanging on a lower side of the frame 140a by a rope PE. The second spawning section 140c is located under about 1.5 m of the water.

Figure 11:
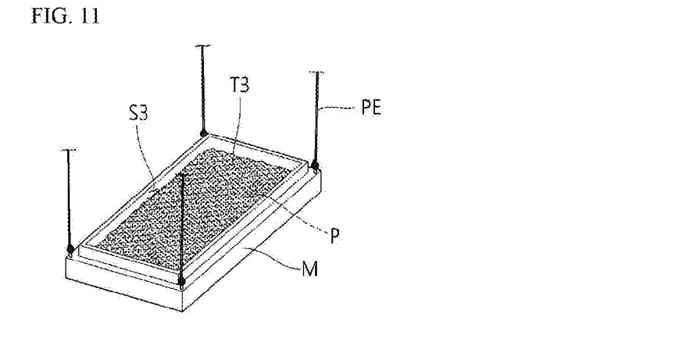
FIG. 11 is a diagram showing a second spawning section of the fourth floating body shown in FIG. 7.

FIG. 11 is a diagram showing the second spawning section of the fourth floating body shown in FIG. 7.

As shown in FIG. 11, the second spawning section 140c includes an underwater frame F and an underwater framework M. Similarly to the frame 140a, the underwater frame F and the underwater framework M are made of wood. The reason is described above.

The underwater frame F is hung on the frame 140a by four polyethylene ropes PE.

The underwater framework M surrounds the underwater frame F to form a spawning space S3 at the second spawning section 140c. The spawning space S3 is filled with soils T3 by a thickness of about 5 cm.

As stated above, the spawning space S1 of the second spawning section 120c of the second floating body 120 is filled with the gravels T1, the spawning space S2 of the second spawning section 130c of the third floating body 130 is filled with the sands T2, and the spawning space S3 of the second spawning section 140c of the fourth floating body 140 is filled with the soils T3. Thus, it is possible to cope with various spawning characteristics of fishes.

For example, *Nipponocypris* and Cyprinidae prefer to spawn at gravels.

*Rhinogobius* and *Tridentiger brevispinis* prefer to spawn at sands or soils.

*Palaemon paucidens* and *Neocardina denticulata* prefer to spawn at roots of plants.

Accordingly, *Nipponocypris* and Cyprinidae are highly likely to spawn at the second spawning section 120c of the second floating body 120, and *Rhinogobius* and *Tridentiger brevispinis* are highly likely to spawn at the second spawning section 130c of the third floating body 130 or the second spawning section 140c of the fourth floating body 140.

For reference, it is assumed that the gravel has a particle diameter of about 4.76 mm or more, the sand has a particle diameter of about 0.25 mm to about 4.76 mm, and the soil has a particle diameter of about 0.005 mm to about 0.25 mm.

The fifth floating body 150 shown in FIG. 7 has a size of about 0.8 meters wide and about 4.0 meters long.

One end of the fifth floating body 150 is connected to the fourth floating body 140 by a hinge, and the other end thereof is flooded in the water.

When the fifth floating body 150 rotates about the hinge by about 15 degrees, the other end of the fifth floating body 150 is located under about 70 cm of the water.

The fifth floating body 150 includes the frame 150a and a planting mat 150b on which plants are planted. The planting mat 150b is provided at a top surface of the frame 150a. The planting mat 150b is made of a cashmilon fiber, a natural fiber or a synthetic fiber. Submerged plants or floating-leaved plants are planted on the planting mat 150b.

An otter habitation structure 160 is provided at a top surface of the second floating body 120. In addition, the otter habitation structure 160 may be provided in plural number at the top surface of the second floating body 120. Further, the otter habitation structure 160 may be provided at a top surface of the fourth floating body 140. Furthermore, the otter habitation structure 160 may be provided at both the top surface of the second floating body 120 and the top surface of the fourth floating body 140.

The otter habitation structure 160 has the same configuration as the otter habitation structure 31a (see FIG. 6) described in the first embodiment, and description thereof will not be repeated.

Figure 12:
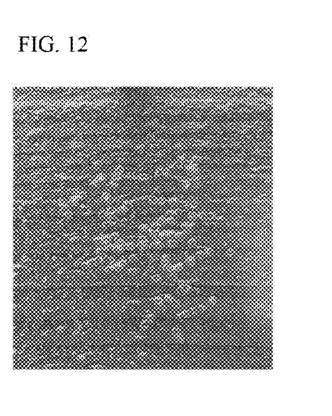
FIG. 12 is a photograph showing a state where spawned eggs are attached to a wooden frame.

FIG. 12 is a photograph showing a state where spawned eggs are attached to the wooden frame. A round circle portion shown in FIG. 12 represents the spawned eggs.

As shown in FIG. 12, the wooden frame serves as a spawning ground. That is, the frame 110a of the first floating body 110, the frame 120a of the second floating body 120, the frame 130a of the third floating body 130, the frame 140a of the fourth floating body 140, and the frame 150a of the fifth floating body 150 shown in FIGS. 7 and 8 serve as a spawning ground.

Figure 13:
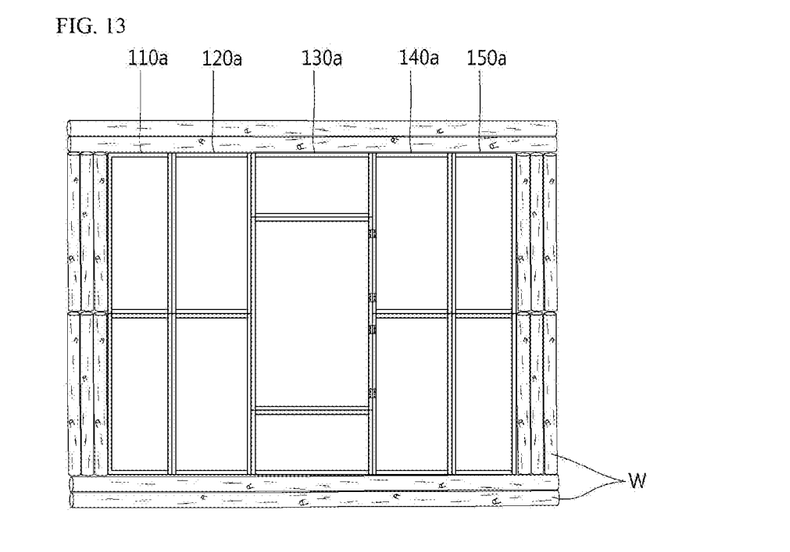
FIG. 13 is a diagram illustrating a state where driftwoods are further provided outside the frame of the first floating body, the frame of the second floating body, the frame of the third floating body, the frame of the fourth floating body, and the frame of the fifth floating body that are connected to one another in FIG. 8.

FIG. 13 is a diagram illustrating a state where driftwoods are further provided outside the frame of the first floating body, the frame of the second floating body, the frame of the third floating body, the frame of the fourth floating body, and the frame of the fifth floating body which are connected to one another in FIG. 8.

As shown in FIG. 13, driftwoods W tied with polyethylene ropes (not shown) are provided outside the frame 110a of the first floating body 110 (see FIG. 7) and the frame 120a of the second floating body 120 (see FIG. 7), the frame 130a of the third floating body 130 (see FIG. 7), the frame 140a of the fourth floating body 140 (see FIG. 7), and the frame 150a of the fifth floating body 150 (see FIG. 7) which are connected to one another. Accordingly, it is possible to easily enlarge a size of the complex floating wetland equipment 100 (see FIG. 7).

The invention claimed is:

1. Complex floating wetland equipment, comprising:
   a floating bridge; and
   floating bodies that are provided at upper left and right sides of the floating bridge and lower left and right sides of the floating bridge around the floating bridge,
   wherein at least any one floating body of the floating bodies includes an overland section, an inclined-surface section, a first spawning section, and a second spawning section, and
   at least any one floating body of the floating bodies includes an otter habitation section and an inclined-surface section.

2. The complex floating wetland equipment according to claim 1, wherein at least one roost is provided at the floating bridge.

3. The complex floating wetland equipment according to claim 1,
   wherein the overland section includes:
   a frame; and
   a planting mat that is provided at a top surface of the frame and on which plants are planted, and
   wherein the frame is made of wood and stainless steel.

4. The complex floating wetland equipment according to claim 1, wherein the inclined-surface section is formed at an opening that is formed in a central portion of the floating body having the overland section, the inclined-surface section and the second spawning section, the inclined-surface section is formed in a circumference of the floating body having the overland section, the inclined-surface section and the second spawning section, and the inclined-surface section is formed in a circumference of the floating body having the otter habitation section and the inclined-surface section.

5. The complex floating wetland equipment according to claim 4,
   wherein the inclined-surface section includes:
   a frame;
   a planting mat that is provided at a top surface of the frame and on which plants are planted; and
   a hinge that connects one end of the frame and the opening, and
   wherein the other end of the frame is flooded in the water,
   floating-leaved plants or submerged plants are planted on the planting mat, and
   the frame is made of wood.

6. The complex floating wetland equipment according to claim 1, wherein the first spawning section includes a string and a cilium hung on a lower side of the overland section, or includes a fish staying block provided at the lower side of the overland section.

7. The complex floating wetland equipment according to claim 1,
   wherein the second spawning section includes:
   a frame; and
   a framework that surrounds the frame to form a spawning space, and
   wherein the spawning space is filled with any one of gravels, sands and soils, or a mixture of gravels, sands and soils depending on spawning characteristics of fishes, and
   the frame is made of wood.

8. The complex floating wetland equipment according to claim 1,
   Wherein at least one otter habitation structure is provided at the otter habitation section, and
   wherein the otter habitation structure includes:
   a habitation space where an otter inhabits;
   an underwater entrance that allows the otter to enter the habitation space in the water; and
   a land entrance that allows the otter to enter the habitation space on the land.

9. Complex floating wetland equipment, comprising:
   a cross-shaped floating bridge;
   a first floating body that is connected onto an upper left side of the floating bridge by using a bolt and a nut and has an overland section, an inclined-surface section, a first spawning section and a second spawning section;
   a second floating body that is connected onto an upper right side of the floating bridge by using a bolt and a nut and has an overland section, an inclined-surface section, a first spawning section and a second spawning section;
   a third floating body that is connected onto a lower left side of the floating bridge by using a bolt and a nut and has an otter habitation section and an inclined-surface section;
   a fourth floating body that is connected onto a lower right side of the floating bridge by using a bolt and a nut and has an overland section, an inclined-surface section, a first spawning section and a second spawning section; and
   at least one roost that is provided at the floating bridge,
   wherein the inclined-surface sections are partially flooded in the water, and
   a spawning space of the second spawning section is filled with any one of gravels, sands and soils, or a mixture of gravels, sands and soils depending on spawning characteristics of fishes.

10. Complex floating wetland equipment, comprising:
    floating bodies that are connected to one another; and
    an otter habitation structure that is provided in at least any one of the floating bodies,
    wherein frames are provided at the respective floating bodies, and
    the frames are made of wood to provide buoyant force and a spawning ground.

11. The complex floating wetland equipment according to claim 10, wherein driftwoods are further provided outside the wooden frames of the floating bodies that are connected to one another.

12. Complex floating wetland equipment according to claim 10,
    wherein at least any one of the floating bodies further includes a second spawning section,
    the second spawning section includes a wooden underwater frame and a wooden underwater framework,
    the wooden underwater framework surrounds the wooden underwater frame to form a spawning space, and
    the wooden underwater framework and the wooden underwater frame themselves provide buoyant force and a spawning ground of fishes.

* * * * *